(12) United States Patent
Köhler et al.

(10) Patent No.: US 9,460,605 B2
(45) Date of Patent: Oct. 4, 2016

(54) HOUSING FOR A COMPUTER SYSTEM AND USE OF A HOUSING

(75) Inventors: Friedrich Köhler, Augsburg (DE); Lorenz Schelshorn, Augsburg (DE)

(73) Assignee: FUJITSU LIMITED, Kawasaki (JP)

( * ) Notice: Subject to any disclaimer, the term of this patent is extended or adjusted under 35 U.S.C. 154(b) by 570 days.

(21) Appl. No.: 13/989,877

(22) PCT Filed: Sep. 28, 2011

(86) PCT No.: PCT/EP2011/066914
§ 371 (c)(1),
(2), (4) Date: Aug. 16, 2013

(87) PCT Pub. No.: WO2012/072306
PCT Pub. Date: Jun. 7, 2012

(65) Prior Publication Data
US 2013/0321162 A1    Dec. 5, 2013

(30) Foreign Application Priority Data
Nov. 30, 2010  (DE) .......................... 10 2010 052 931

(51) Int. Cl.
*G08B 21/00*  (2006.01)
*G08B 13/08*  (2006.01)
*H01H 3/16*  (2006.01)
*G08B 21/18*  (2006.01)
*G06F 1/18*  (2006.01)

(52) U.S. Cl.
CPC .............. *G08B 21/18* (2013.01); *G06F 1/181* (2013.01)

(58) Field of Classification Search
CPC ...................................... G08B 21/18
USPC ....................................... 340/686.1
See application file for complete search history.

(56) References Cited

U.S. PATENT DOCUMENTS

| | | | | |
|---|---|---|---|---|
| 4,977,392 A | * | 12/1990 | Loda | G08B 13/149 200/61.41 |
| 5,479,152 A | * | 12/1995 | Walker | F25D 29/008 200/61.62 |
| 5,656,982 A | * | 8/1997 | Kurahara | H01H 36/004 335/205 |

(Continued)

FOREIGN PATENT DOCUMENTS

| | | |
|---|---|---|
| DE | 10 2009 019 517 A1 | 12/2010 |
| EP | 0 892 334 B1 | 2/2003 |

(Continued)

OTHER PUBLICATIONS

Notice of Reasons for Rejection dated Jun. 16, 2015 of corresponding Japanese Patent Application No. 2013-541258 along with a partial English translation.

*Primary Examiner* — Jennifer Mehmood
*Assistant Examiner* — John Mortell
(74) *Attorney, Agent, or Firm* — Fujitsu Patent Center

(57) ABSTRACT

A housing for a computer system includes at least one first and one second housing opening, at least one first housing cover and one second housing cover, wherein the first housing opening can be closed by the first housing cover and the second housing opening can be closed by the second housing cover, and a switching element having a switching contact, wherein the switching element is arranged such that, both when opening the first housing cover and when opening the second housing cover, the switching contact is triggered to indicate that the housing has been opened.

16 Claims, 4 Drawing Sheets

(56) References Cited

U.S. PATENT DOCUMENTS

| | | | |
|---|---|---|---|
| 6,014,747 A | 1/2000 | Fackenthall et al. | |
| 6,023,887 A * | 2/2000 | Okubo | H01H 9/226 200/61.69 |
| 6,795,926 B1 | 9/2004 | Matula et al. | |
| 2004/0216471 A1 | 11/2004 | Kim et al. | |
| 2006/0049941 A1 | 3/2006 | Hunter et al. | |
| 2008/0257639 A1* | 10/2008 | Yamaguchi | H05K 7/20736 181/198 |
| 2010/0239307 A1 | 9/2010 | Onuma et al. | |
| 2011/0182614 A1* | 7/2011 | Onuma | G03G 21/1633 399/110 |

FOREIGN PATENT DOCUMENTS

| | | |
|---|---|---|
| GB | 2 300 743 A | 11/1996 |
| JP | 2004-154975 A | 6/2004 |
| JP | 2005-111896 A | 4/2005 |
| JP | 2010-21747 A | 9/2010 |
| JP | 2011-47971 A | 3/2011 |

* cited by examiner

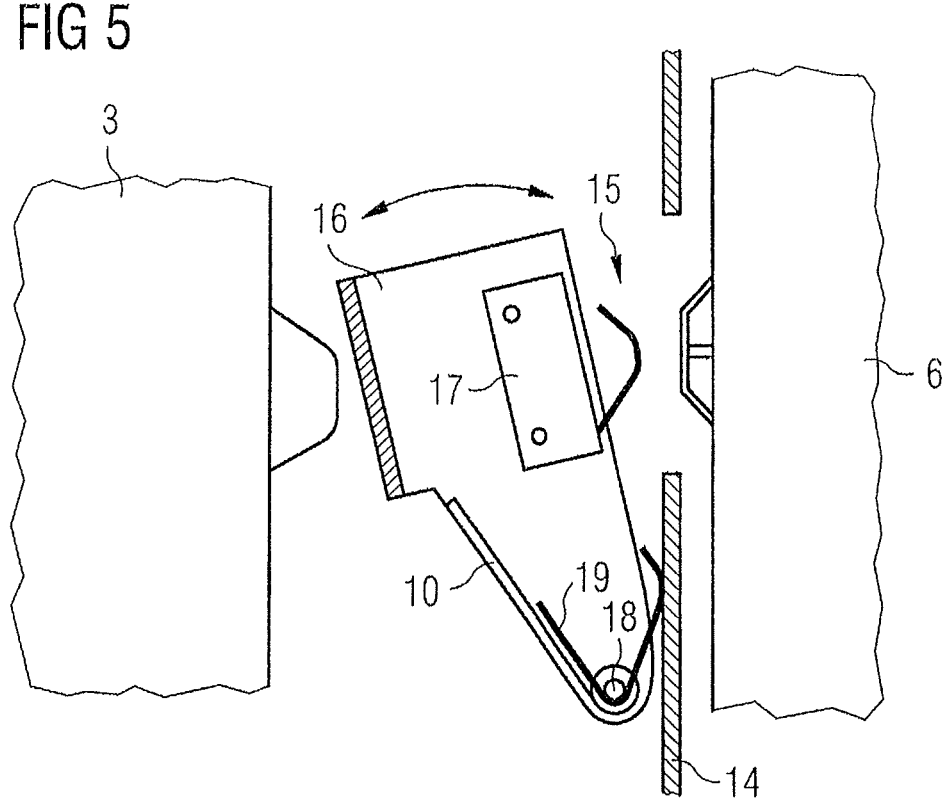

HOUSING FOR A COMPUTER SYSTEM AND USE OF A HOUSING

TECHNICAL FIELD

This disclosure relates to a housing for a computer system, having at least one first and one second housing opening, where the first housing opening can be closed by a first housing cover and the second housing opening can be closed by a second housing cover. The disclosure further relates to the use of such a housing in an arrangement comprising at least one computer to be monitored and at least one monitoring device.

BACKGROUND

Housings for a computer system having at least a first and a second housing opening are widely known. For example, DE 102009019517 discloses a housing for an electronic device which has a lock, a first locking mechanism and a second locking mechanism. The locking mechanisms are designed and positively coupled to lock and unlock different housing elements, wherein they interact with the lock.

Such housings are used, for example, for what are known as server computers, which comprise a plurality of powerful components, for example, processors and storage drives. To permit a flexible arrangement of a multiplicity of components, relatively large-volume tower housings, as they are known, are often used for this purpose. Access to the individual components arranged in the housing is necessary only relatively infrequently. Therefore, these are currently arranged behind housing covers in the form of flap walls or housing walls.

In particular, high-quality computer housings permit monitoring as to whether a housing has been closed properly. For this purpose, a switching contact for a housing opening is generally provided, which registers the state of a housing cover.

There is thus a need for a particularly simply constructed housing for a computer system having at least two closable housing openings. Furthermore, it could be helpful to provide a possible way of monitoring an opening state of a plurality of housing covers with little expenditure on components.

SUMMARY

We provide a housing for a computer system including at least one first and one second housing opening, at least one first housing cover and one second housing cover, where the first housing opening can be closed by the first housing cover and the second housing opening can be closed by the second housing cover, and a switching element having a switching contact, wherein the switching element is arranged such that, both when opening the first housing cover and when opening the second housing cover, the switching contact is triggered to indicate that the housing has been opened.

We also provide an arrangement including at least one computer to be monitored arranged in the housing, and at least one monitoring device connected to the switching element to provide a control signal and, on the basis of the control signal, indicates whether at least one of the two housing covers has been opened.

BRIEF DESCRIPTION OF THE DRAWINGS

FIG. 5 shows the switching element in a third state.

LIST OF DESIGNATIONS

Figure 1:
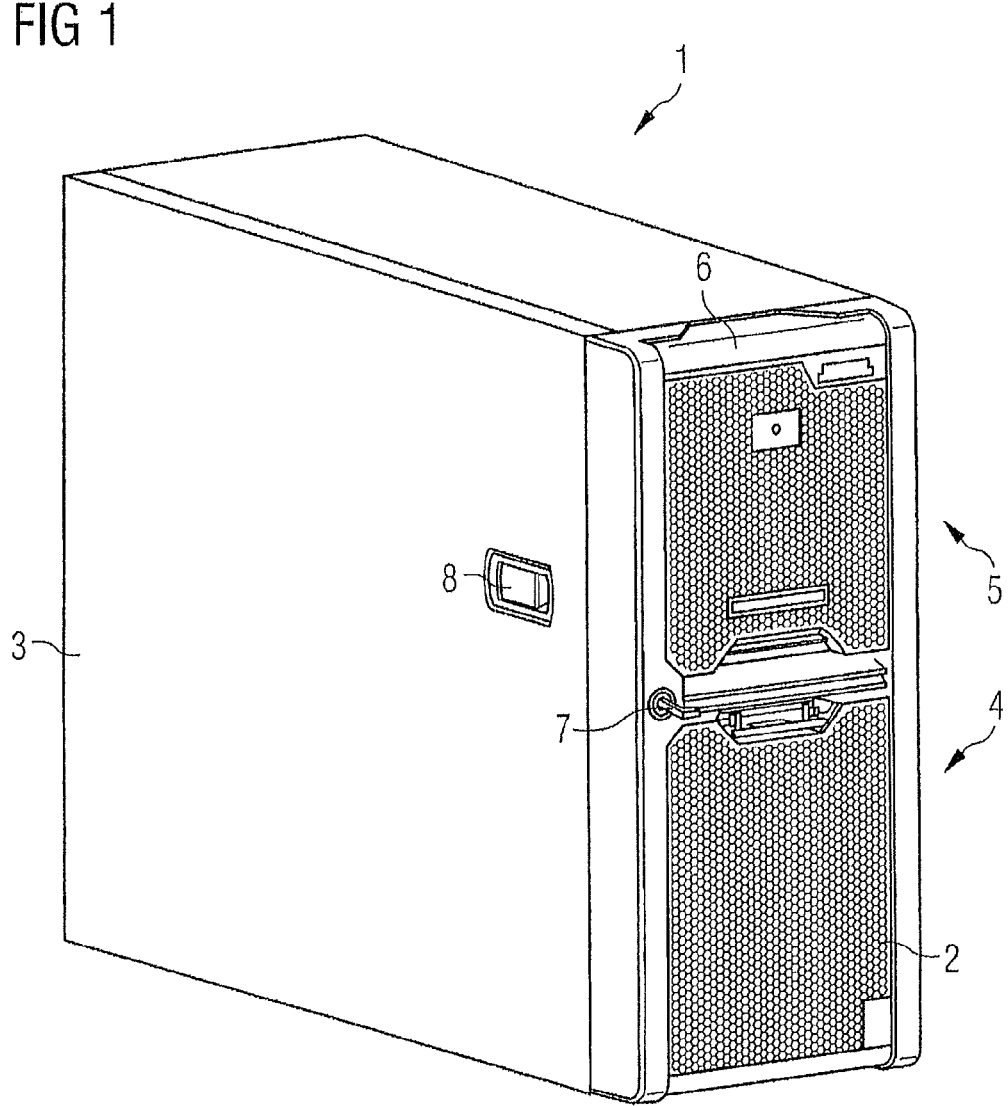
FIG. 1 shows a perspective outer view of a housing.

1 Housing
2 Front side
3 Side wall
4 Lower region
5 Upper region
6 Flap
7 Lock
8 Handle element
9 Closure element
10 Switching element
11 Switching lug (of the side wall)
12 Switching lug (of the flap)
13 Opening
14 Housing wall
15 Switching contact
16 Rocker
17 Switch housing
18 Axis of rotation
19 Spring

DETAILED DESCRIPTION

We provide a housing for a computer system having at least one first and one second housing opening, where the first housing opening can be closed by a first housing cover and the second housing opening can be closed by a second housing cover. The housing is characterized in that a switching element having a switching contact is provided, wherein the switching element is arranged such that, both when opening the first housing cover and when opening the second housing cover, the switching contact is triggered to indicate that the computer housing has been opened. As a result of using a single switching element to monitor the opening of two different housing covers, the number of necessary switching elements for monitoring can be reduced.

A switch housing of the switching element may be mounted such that it can move, part of the first housing cover acting on the switching contact and part of the second housing cover acting on the switch housing so that a relative movement between the switching contact and the switch housing is effected both as a result of opening the first housing cover and as a result of opening the second housing cover.

The switch housing may be rotatably mounted on a rocker in the region between the first and the second housing opening. An arrangement of this type permits a simple mechanical transfer of a movement of the first housing cover and a movement of the second housing cover to trigger the common switching contact.

Housings of this type are suitable in particular for use in an arrangement comprising at least one computer to be monitored, which is arranged in the housing, and at least one monitoring device, which is connected to the switching element to provide a control signal and is designed, on the basis of the control signal, to indicate whether at least one of the two housing covers has been opened. In an arrangement of this type, a single control signal is sufficient to monitor the computer or the opening state of the housing covers of the latter. This is advantageous in particular when monitoring a multiplicity of different computers.

Further advantages are described in the following extensive description of an example.

FIG. 1 shows a front view of a housing 1 for a server computer. In the example, the housing 1 is, for example, what is known as a tower housing. The housing 1 has a front side 2 and a removable side wall 3.

The front side 2 comprises a lower region 4 and an upper region 5. The lower region 4 has, for example, a housing cover with ventilation openings to take in or blow out cooling air. The upper region 5 in the example comprises a flap 6, behind which a plurality of storage drives not visible in FIG. 1, for example, hard drives, CD or DVD drives are arranged. Optionally, the drives are configured to be removable and protected by the flap 6. The flap 6 can be closed by a lock 7. The side wall 3 can be unlocked by a handle element 8 and then taken off from the housing 1. After the side wall 3 has been taken off, access can be gained to internal components of the server computer such as, for example, ventilation modules arranged therein, memory modules, processors or power supply units. In one configuration, the lock 7 additionally acts on the handle element 8 and locks the latter.

Figure 2:
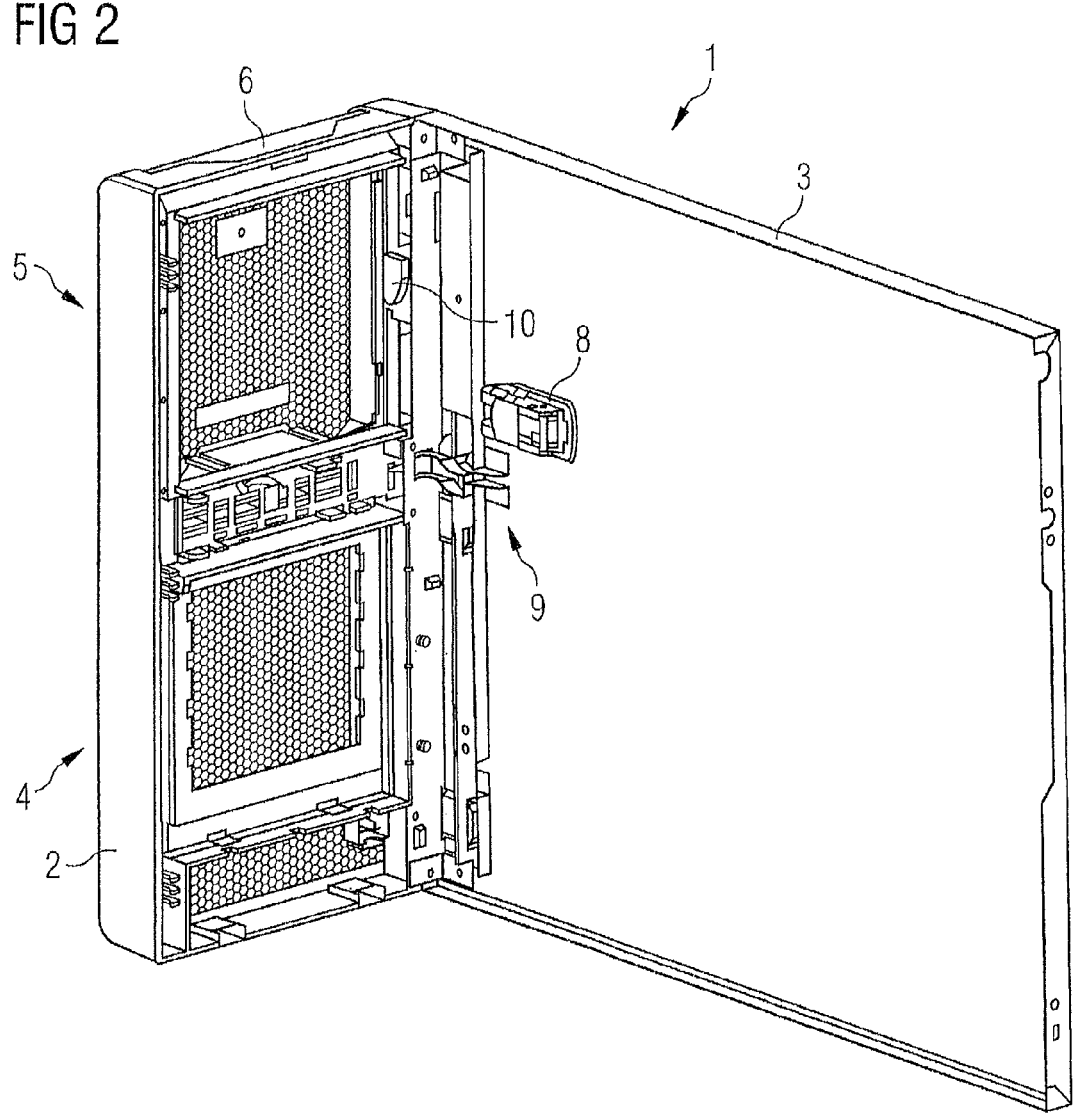
FIG. 2 shows a perspective inner view of the housing.

In FIG. 2, an inner view of the housing 1 onto the front side 2 and the side wall 3 is shown. Visible therein, inter alia, is a closure element 9 coupled to the lock 7 and locks the flap 6 and the side wall 3. It can additionally be seen that, in a region of a housing edge between the flap 6 and the side wall 3, there is arranged a switching element 10. The switching element 10 is used to monitor an opening state of the housing openings of the housing 1 and will be described in more detail below with reference to FIGS. 3 to 5.

Figure 3:
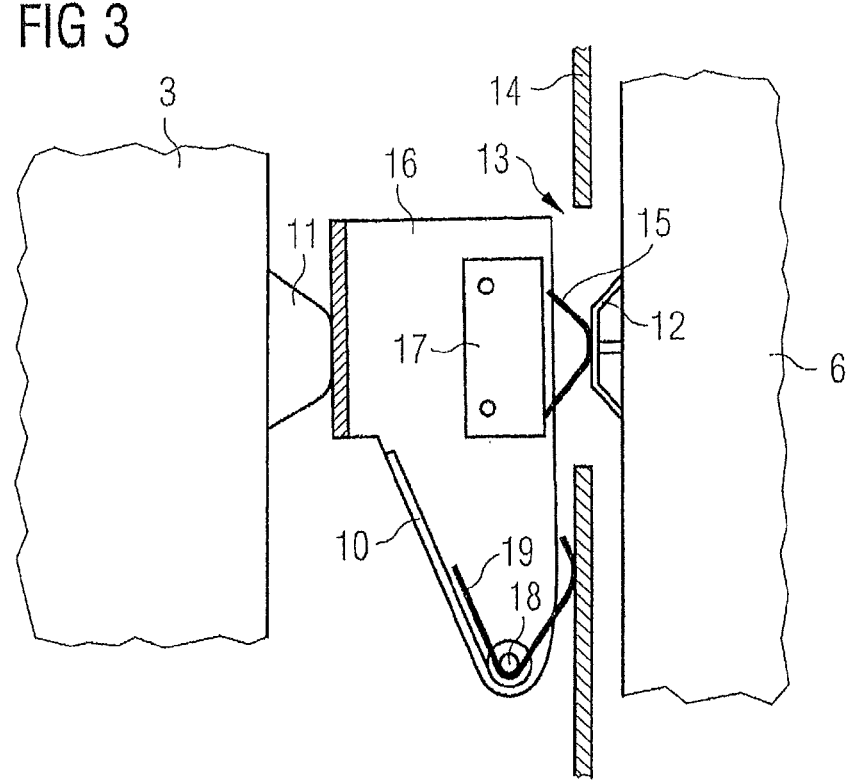
FIG. 3 shows a switching element in a first state.

FIG. 3 shows the switching element 10 in a first state. In the first state, both the flap 6 and the side wall 3 of the housing 1 are closed.

FIG. 3 reveals that both the side wall 3 and the flap 6 each have a switching lug 11 and 12, respectively, which act on the switching element 10. In particular, the switching lug 12 of the flap 6 presses through an opening 13 in a housing wall 14 onto a switching contact 15, for example, a switching lever that activates a microswitch that is pressed down in the first state. The switching lug 11 of the side wall 3 acts on a stop of a rocker 16 on which a switch housing 17 of the switching element 10 is mounted. The rocker 16 is rotatably mounted in relation to the housing wall 14 by an axis of rotation 18. Between the rocker 16 and the housing wall 14 in the example illustrated in FIG. 3 there is arranged a spring 19 which exerts a force on the rocker 16, with which the latter is pressed away from the housing wall 14.

Figure 4:
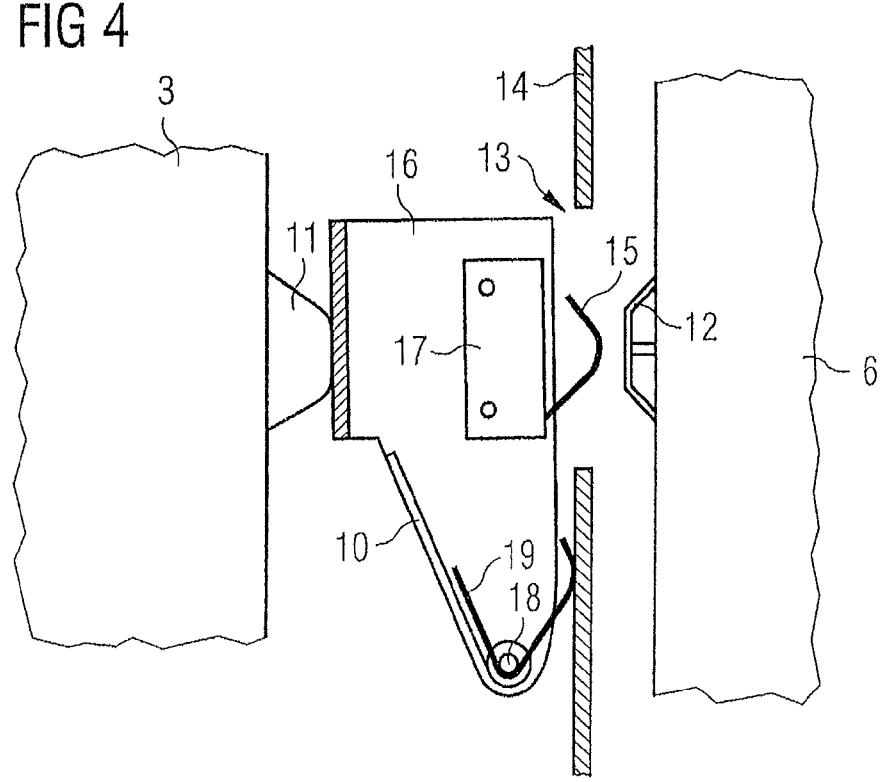
FIG. 4 shows the switching element in a second state.

FIG. 4 shows the switching element 10 in a second state. In the second state, the flap 6 with which, for example, the drives of the computer system are covered has been opened.

In the state illustrated, the switching element 10 switches, for example, as a result of the fact that the lever of the switching contact 15 emerges toward the front through the opening 13 of the housing wall 14. If the switching element used is, for example, what is known as a normally open contact which makes a circuit when the switching contact 15 is pressed down, an electrical signal is therefore interrupted by the switching element 10 when the flap 6 is opened. Of course, conversely, a normally closed contact can also be used as switching element 10.

In FIG. 5, the switching element 10 is shown in a third state. In the third state, the side wall 3 has been taken off from the housing 1. The flap 6 is closed in the state illustrated in FIG. 5.

Since, in the state illustrated in FIG. 5, the side wall no longer exerts a force on the rocker 16, the spring 19 presses the rocker 16 and therefore the switch housing 17 of the switching element 10 away from the housing wall 14. Thus, the switching contact 15 of the switching element 10 opens despite the flap 6 being closed and, as in the second state, interrupts a control signal generated by the switching element 10.

Advantageously, the control signals generated by the switching element 10 may be transmitted to a monitoring device to monitor the housing 1. This can be a local indicating device, for example, in the form of an LED on the front side 2 which indicates whether the housing 1 has been closed properly.

Advantageously, however, the signal from the switching element 10 is transmitted to a device to remotely monitor the computer system 1. For example, a switching output of the switching element 10 can be connected to what is known as a system monitoring module, also known as a baseboard management controller (BMC), of a server computer. The system monitoring module then permits remote monitoring of the computer system from a central monitoring computer via a network so that, for example, a system administrator can detect remotely whether anyone is making an unauthorized attempt to access drives of the computer system or to open the housing 1 without authorization.

Although housing has previously been described with reference to a specific arrangement having a housing with two housing openings, it is in principle also suitable for use in other housings, in particular having more than two housing openings. Even in this case to manage with only a single switching element for monitoring the opening state of all the housing openings, a suitable mechanical coupling between each of the housing openings to be monitored and the common switching element should be provided, so that mechanical OR switching is produced.

The invention claimed is:

1. A housing for a computer system comprising:
   at least one first and one second housing opening that are separate from one another, each opening bordered by a wall of the housing,
   at least one first housing cover and one second housing cover, where the first housing opening can be closed by the first housing cover and the second housing opening can be closed by the second housing cover, and
   a switching element having a switching contact, wherein the switching element is arranged such that, both when opening the first housing cover and when opening the second housing cover, the switching contact is triggered to indicate that the housing has been opened, and
   a switch housing of the switching element is mounted such that it can move, part of the first housing cover acting on the switching contact and part of the second housing cover directly acting on the switch housing, so that a relative movement between the switching contact and the switch housing is effected both when opening the first housing cover and when opening the second housing cover.

2. The housing according to claim 1, wherein the switch housing is rotatably mounted on a rocker in a region between the first and the second housing opening.

3. The housing according to claim 2, wherein a spring element acts on the rocker, which spring element exerts a force toward the second housing cover.

4. The housing according to claim 1, wherein the first housing cover is a flap arranged on a front side of the housing to close one or more drives accessible from the front side.

5. The housing according to claim 1, wherein the second housing cover forms a removable side wall of the housing to close an access to internal components of the computer system.

6. An arrangement comprising at least one computer to be monitored arranged in the housing according to claim 1, and at least one monitoring device connected to the switching element to provide a control signal and, on the basis of the control signal, indicates whether at least one of the two housing covers has been opened.

7. The arrangement according to claim 6, wherein the monitoring device comprises a system monitoring module.

8. The housing according to claim 2, wherein the first housing cover is a flap arranged on a front side of the housing to close one or more drives accessible from the front side.

9. The housing according to claim 3, wherein the first housing cover is a flap arranged on a front side of the housing to close one or more drives accessible from the front side.

10. The housing according to claim 2, wherein the second housing cover forms a removable side wall of the housing to close an access to internal components of the computer system.

11. The housing according to claim 3, wherein the second housing cover forms a removable side wall of the housing to close an access to internal components of the computer system.

12. The housing according to claim 4, wherein the second housing cover forms a removable side wall of the housing to close an access to internal components of the computer system.

13. An arrangement comprising at least one computer to be monitored arranged in the housing according to claim 2, and at least one monitoring device connected to the switching element to provide a control signal and, on the basis of the control signal, indicates whether at least one of the two housing covers has been opened.

14. An arrangement comprising at least one computer to be monitored arranged in the housing according to claim 3, and at least one monitoring device connected to the switching element to provide a control signal and, on the basis of the control signal, indicates whether at least one of the two housing covers has been opened.

15. An arrangement comprising at least one computer to be monitored arranged in the housing according to claim 4, and at least one monitoring device connected to the switching element to provide a control signal and, on the basis of the control signal, indicates whether at least one of the two housing covers has been opened.

16. An arrangement comprising at least one computer to be monitored arranged in the housing according to claim 5, and at least one monitoring device connected to the switching element to provide a control signal and, on the basis of the control signal, indicates whether at least one of the two housing covers has been opened.

* * * * *